(No Model.)
S. T. REAMY.
SAW MILL FEED.
No. 411,679. Patented Sept. 24, 1889.
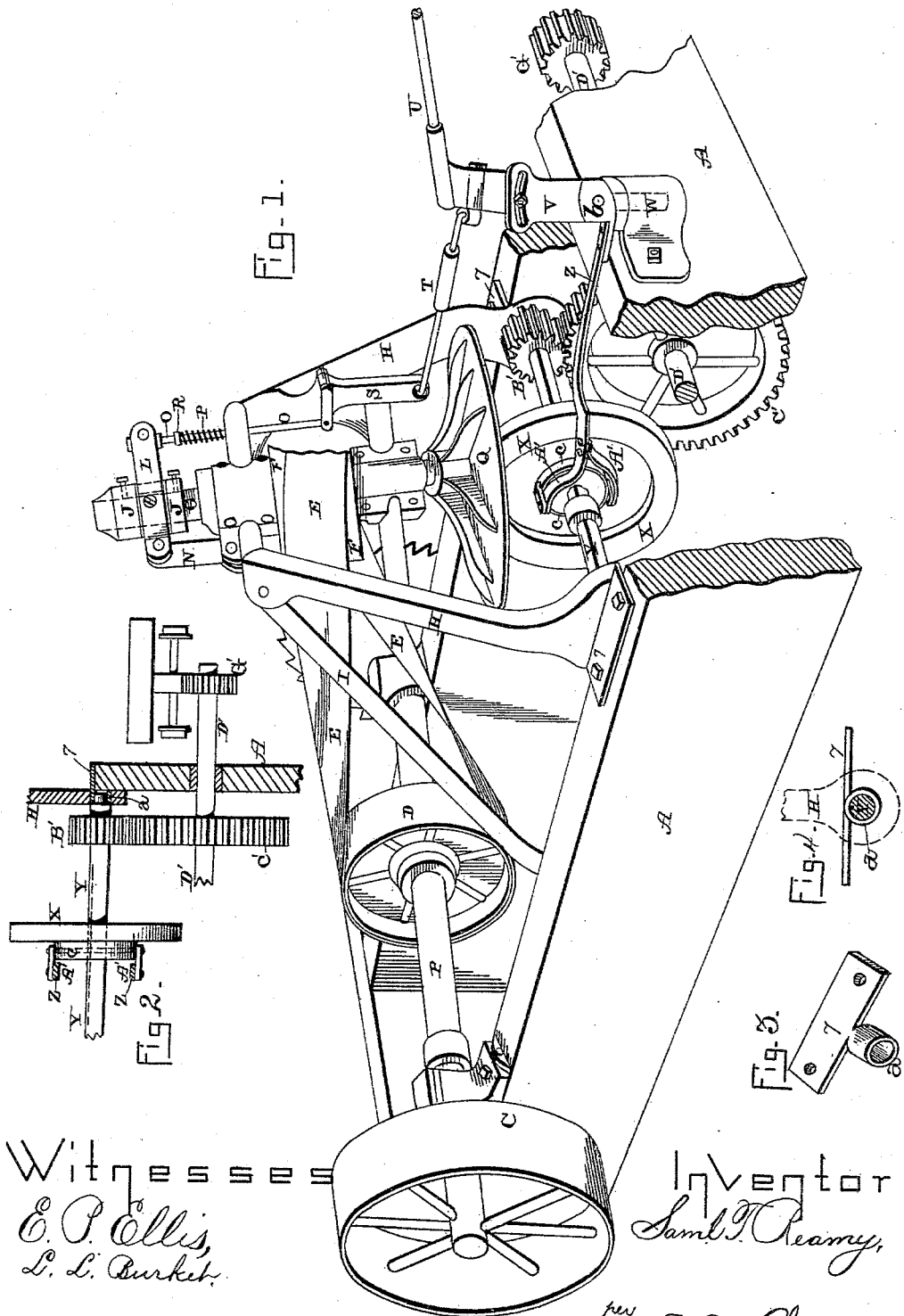
Witnesses
E. P. Ellis,
L. L. Burket.
Inventor
Sam'l T. Reamy,
per J. A. Lehmann, atty.

UNITED STATES PATENT OFFICE.

SAMUEL T. REAMY, OF TAPPAHANNOCK, VIRGINIA, ASSIGNOR TO T. J. & F. A. REAMY, OF NASHVILLE, TENNESSEE.

SAW-MILL FEED.

SPECIFICATION forming part of Letters Patent No. 411,679, dated September 24, 1889.

Application filed January 12, 1889. Serial No. 296,176. (No model.)

*To all whom it may concern:*

Be it known that I, SAMUEL T. REAMY, of Tappahannock, in the county of Essex and State of Virginia, have invented certain new and useful Improvements in Saw-Mill Feed; and I do hereby declare the following to be a full, clear, and exact description of the invention, such as will enable others skilled in the art to which it pertains to make and use it, reference being had to the accompanying drawings, which form part of this specification.

My invention relates to an improvement in saw-mills; and it consists in the combination of a suitable driving-shaft, a belt extending therefrom, a shaft carrying the driving-disk upon its lower end, and a mechanism for raising and depressing the shaft, whereby the driving-disk is made to operate a laterally-moving pulley placed upon the counter-shaft, as will be more fully described hereinafter.

The object of my invention is to make the shaft which carries the driving-disk vertically adjustable, so that the disk will come squarely in contact with the pulley or the counter-shaft, and thus give the benefit of the entire face of the driving-pulley and enable a variable feed to be produced, so that the operator can saw fast or slow, as may be desired.

In the accompanying drawings, Figure 1 represents a perspective of a machine, partly in section, and which embodies my invention complete. Fig. 2 is a detached view of the two shafts Y D' and their attachments. Fig. 3 is a perspective of one of the boxes. Fig. 4 is an end view of the same.

A represents a suitable frame-work, upon which is mounted the driving-shaft B at one end, and to this shaft is secured the driving-pulleys C D. From the pulley D extends the belt E, which is given one-quarter twist, and this belt extends around the pulley F upon the shaft G, which is journaled in a suitable frame-work H. This frame-work is placed at a suitable angle, and has its lower ends journaled upon the boxes 7, in which the counter-shaft is journaled. These boxes 7 are secured to the top of the frame A, and have the tubular sockets and bearings *a* formed on their inner sides both to receive the ends of the shaft Y and to form pivotal bearings for the lower ends of the frame H. The frame H is pivoted upon the boxes and placed at a slight angle, so as to adjust the pulley F to the proper angle and cause it to run without binding. As the saw-mills are made of different sizes, the frame H must be pivoted, so as to adapt my invention to mills of all kinds. The frame is moved into the desired position, and then the lower end of the brace I is fastened inside of the frame A, so as to hold it rigidly. The brace I supports this frame H at such an angle as to enable the belt E to be applied to the pulley F to the best advantage. To the upper end of the shaft G are secured two collars J, which revolve with the shaft, and in between these two revolving collars is placed a loose collar, which is not affected by the rotation of the shaft, and to this loose collar is attached the yoke L. This yoke L is pivoted at one end upon a support N, and has its other end attached to the vertically-moving rod O, around which the spring P is placed. This yoke being attached to the loose collar between the two collars J is thus enabled to raise and lower the shaft G without interfering in any manner with the rotation of the shaft, which is journaled in suitable boxes formed in the frame H. Upon the lower end of the shaft G is rigidly secured the operating-disk Q, by means of which the pulley upon the counter-shaft is driven. The spring P upon the vertically-moving rod O is sufficiently strong to hold the shaft G and disk Q in a raised position until the tension of the spring is overcome by the operator and the shaft and its disk are forced downward. The lower end of the spring rests upon the top of the frame H, while the upper end bears against a nut R on the rod. The lower end of the rod O is connected to the bell-crank S, which is pivoted upon the frame H, and to the lower end of this crank S is secured the connecting-rod T. The outer end of the connecting-rod T is fastened to the operating-lever U, which is pivoted to the slotted partially-rotating post V, which is mounted at its lower end in the socket or box W. The lever U can be turned upon its pivot *b* as far as the slot in the post V will allow, and when the outer end of this lever U is depressed the connecting-rod and bell-crank S draw the rod O downward for the purpose of depressing the shaft G and the disk Q. When the outer end of the lever U is raised, the tension is taken from the spring P, and it forces the shaft G and its disk upward and out of contact with the driving-pulley X upon the shaft Y. The post V has secured to it an operating rod or lever Z, and to the inner end of this lever Z are loosely attached two prongs A', which extend upon opposite sides of the pulley X and fit loosely over hubs formed on each side of a cuff c, that fits in a groove made in hub of pulley X, thus enabling the pulley to be moved without binding.

When the post V has been partially revolved, the lever Z causes the pulley X, which is feathered upon the counter-shaft Y, to move laterally, so as to change its bearing from one side to the other of the center of motion upon the disk Q. When this pulley X, which is preferably made of paper, is moved upon its shaft Y, so that its rim presses against one side of the disk Q, the carriage is driven in one direction, but when the pulley is moved to the opposite side of the disk the movement of the carriage is reversed. When the center of the disk bears upon the pulley X, no movement whatever is given to the saw-shaft. It will be seen that this disk Q descends squarely upon the pulley X and operates the pulley from its periphery, thus giving the same amount of friction at any point.

Upon the counter-shaft is placed the pinion B', and this pinion meshes with the wheel C', which is placed upon the shaft D', which is provided with the pulley G', for moving the carriage back and forth in the usual manner.

By placing the shaft G in an inclined position I am enabled to drive it by means of the belt E and thus dispense with two of the beveled wheels which have heretofore been used, thus greatly simplifying and cheapening the construction of the machine and enabling it to be driven with a less expenditure of power than has heretofore been possible.

Having thus described my invention, I claim—

1. The combination of the driving-shaft, the belt extending therefrom, the upright frame H, the endwise-moving shaft provided with a disk upon its lower end, and the friction-wheel placed upon the counter-shaft, substantially as shown.

2. The combination of the frame, the driving-shaft mounted thereon, the driving-belt extending from this shaft, the upright frame H, the endwise-moving shaft provided with a disk upon its lower end, a spring-actuated mechanism for moving the shaft endwise, and the friction-wheel placed upon the shaft Y, substantially as described.

3. The combination of the frame, the saw-shaft, the belt extending from the shaft, the endwise-moving shaft, the frame H, in which the shaft is journaled, the yoke which is applied to the shaft, the spring-actuated rod connected to the yoke, the crank, the connecting-rod, the operating-lever, the disk Q, and friction-wheel which engages with the disk on the lower end of the shaft G, and counter-shaft, substantially as set forth.

4. The combination of the lever U, the partially-revolving post V, to which the lever is connected, the lever Z, secured to the post V, the counter-shaft Y, friction-wheel X, the driving-disk Q, placed upon the endwise-moving shaft G, and an operating mechanism for the shaft G, substantially as specified.

5. The combination of the endwise-moving shaft provided with a driving-disk, a belt for driving the shaft, the frame H, in which the shaft is journaled, the collars applied to the shaft, the pivoted yoke which supports the shaft, the rod O, connected to the free end of the yoke, the spring P, placed upon the rod, the bell-crank S, pivoted upon the frame H, the connecting-rod T, and the lever U, mounted upon the partially-rotary post V, with the arm or lever Z, connected to the post, the laterally-movable friction-wheel X, and the counter-shaft, substantially as described.

In testimony whereof I affix my signature in presence of two witnesses.

SAMUEL T. REAMY.

Witnesses:
WM. JARVIS REAMY,
IRVING F. REAMY.